United States Patent [19]

O'Meara

[11] 4,068,234
[45] Jan. 10, 1978

[54] FREQUENCY SCANNED ILLUMINATION IMAGING ARRAY

[75] Inventor: Thomas R. O'Meara, Malibu, Calif.

[73] Assignee: Hughes Aircraft Company, Culver City, Calif.

[21] Appl. No.: 641,395

[22] Filed: Dec. 16, 1975

[51] Int. Cl.² .............................................. G01S 7/04
[52] U.S. Cl. .................................. 343/17; 340/5 MP; 356/5
[58] Field of Search ............ 343/17; 340/5 MP, 5 H; 356/5

[56] References Cited

U.S. PATENT DOCUMENTS

| 3,794,964 | 2/1974 | Katakura | 340/5 MP |
| 3,918,025 | 11/1975 | Koshikawa et al. | 340/5 MP |
| 3,953,822 | 4/1975 | Vilkomerson | 343/17 |

Primary Examiner—S. C. Buczinski
Attorney, Agent, or Firm—Lawrence V. Link, Jr.; W. H. MacAllister

[57] ABSTRACT

Disclosed herein is an imaging system comprising a linear array of receivers and a single transmitter deployed and operated in such a manner as to produce the equivalent of a completely filled, two-dimensional array.

4 Claims, 3 Drawing Figures

FREQUENCY SCANNED ILLUMINATION IMAGING ARRAY

The invention claimed herein was made in the course of a contract or subcontract thereunder, with the United States Army.

CROSS-REFERENCE TO A RELATED APPLICATION

A portion of the subject matter disclosed herein relates to commonly owned U.S. patent application Ser. No. 641,329, filed Dec. 16, 1975, by W. P. Brown, Jr. and entitled "Polarization Referenced Imaging Techniques."

BACKGROUND OF THE INVENTION

This invention relates to imaging systems and particularly to such systems which employ arrays of receiving elements.

An object which is actively illuminated may be conceived of as a highly randomized phased array which radiates a far-field pattern expressible as a two-dimensional Fourier Transform of the excitation distribution currents induced by the incident or illumination field. In general, to accurately reconstruct the magnitude and phase of this source distribution, or more accurately an N × M sample function representative thereof, N × M sample points in the far field, are required and normally N × M receivers are needed. For example, at an operating frequency of 10.6 $\mu$m, for 30 centimeter resolution of an object at 35,000 meters, a matrix of approximately 50 × 50, i.e. 2500, receiving element might be required. As the required resolution and/or imaging range increases, for the standard "full matrix" approach, the number of required receiving sites increases so rapidly as to be prohibitive from a cost viewpoint. For the above example, a 100 × 100 receiving matrix would provide only a modest increase in performance while requiring 10,000 receiving sites. Also, it is expected that employing convention array thinning techniques to replace an N × M array with N + M spatial samples would produce relatively poor quality imagery.

SUMMARY OF THE INVENTION

A primary object of the subject invention is to provide an imaging array system which allows the use of substantially fewer receiving units than comparable prior art systems.

A further object of the invention is to provide an improved linear array imaging system that not only allows a large reduction in the number of receiving units but which compensates for phase distortions encountered along the receiving paths and for position errors of receiving elements within the array.

An important aspect of the subject invention is the recognition of the fact that if the phase of the illuminating source distribution can be changed in a proper manner, the associated far-field pattern can be "phase scanned" across the receiving zone such that a single linear array of receivers can, with proper signal processing, sample the entire radiation pattern and generate the same number of samples as a rectangular array.

In accordance with one embodiment of the invention, a linear array of receiving elements which may be optical or microwave receivers, for example, is deployed at approximately a right angle to a line joining the target area and a transmitter. The target is illuminated by a beam from the transmitter and the scattered radiation forms a diffraction pattern at the receiving area such that the linear receiver array samples a linear "cut" of the pattern. The frequency of the transmitter is changed in discrete steps with each step causing the diffraction pattern to move a distance corresponding to one resolution line. In this manner, a complete two-dimensional set of samples of the diffraction pattern can be recorded by a linear array of receiving elements. For example, if the transmitter is sequenced through M frequency steps and if there are N receiving elements in the linear array, then N × M samples corresponding to an N × M rectangular array are provided. This set of samples may be converted into an image of the target (or rather the target's reflectivity function) by an appropriate inverse Fourier Transform computation operating on the ensemble of the sample set.

In accordance with the invention, data processing problems which could be expected because different samples of the far-field are obtained at different illumination frequencies, are avoided by use of a polarization referenced processing technique. This technique uses polarization to separate a reference signal from the imagery signal; which reference is utilized for the frequency translation of the imagery data so as to effectively eliminate the effects of the carrier frequency. Thus, the fact that different samples are at different frequencies as they enter the receiver presents no problem to the image reconstruction. Also, phase shifts introduced by atmospheric perturbations in the receiving paths or the receiver's local oscillator's phase; or inaccuracies in the position of receiving elements within the array are removed by the polarization referenced data processing technique.

In accordane with a second embodiment of the invention, rather than scanning sequentially by stepping the frequency of the transmitter, a plurality of discrete frequencies are simultaneously propagated. Each receiver is implemented so as to separately and simultaneously process each of the transmitted frequencies by means of appropriate filters and parallel processing channels so as to provide a plurality of simultaneous outputs which are processed to reconstruct the image.

BRIEF DESCRIPTION OF THE DRAWINGS

The novel features of this invention, as well as the invention itself, will be best understood from the accompanying description taken in connection with the accompanying drawings in which like reference characters refer to like parts and in which.

DETAILED DESCRIPTION OF THE PREFERRED EMBODIMENTS

Figure 1:
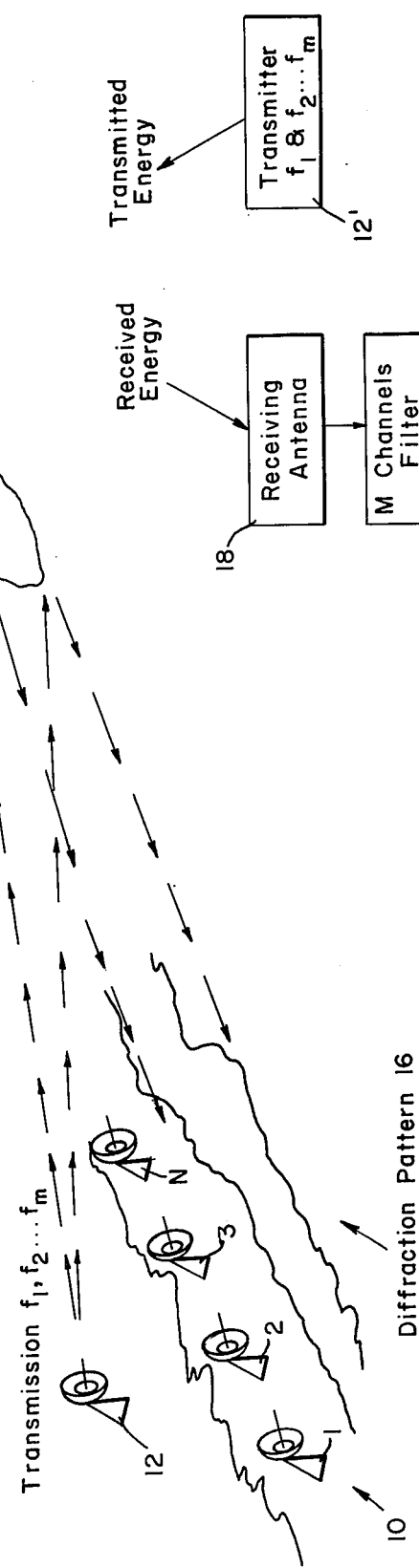
FIG. 1 is a perspective view of a transmitter and a linear array of receiver units oriented for imaging a target area.

The embodiment of the subject invention shown in FIG. 1, comprises a linear receiving array 10 having receiver units 1, 2, 3 . . . N; and a transmitter unit 12. The receiving elements of array 10, which may be optical telescopes or microwave antennas, for example, are deployed along a line which is approximately at a right angle to the line of sight between a target location 14 and transmitter 12. When the target is illuminated by a beam of energy from transmitter 12, the resultant scattered radiation from target 14 forms a diffraction pattern 16 and linear receiving array 10 samples a linear "cut" of this pattern.

In accordance with one embodiment of the invention, the frequency of the transmitter beam is changed in discrete steps and with each step the diffraction pattern falling on the ground moves a distance corresponding to one resolution line of the resultant target image. In this manner, a two-dimensional set of samples of the diffraction pattern can be recorded by only a one-dimensional array of receiving elements. For example, if transmitter 12 is sequenced through M frequency steps then M × N samples corresponding to an M × N rectangular array are provided. The stepping of the frequency of transmitter 12 changes the effective phasing between the target's reradiating scattering centers and thereby shifts or scans the far-field pattern in a manner somewhat analogous to a frequency scan radar. Hence, a linear array of N receiving units combined with a single transmitter sequenced through M frequency steps can generate the equivalent number of samples normally only available from a fully rectangular matrix of M × N receiving elements. As noted hereinabove, this permits a very substantial reduction in the number of receiving units required for a given quality of imagery. For example, the number of such units may be reduced from a two-dimensional array of 50 × 50, i.e. 2500 receiving units, to a linear array of 50 units.

In order to obtain an appreciable scanning effect, the receiver and transmitter should not be located at mirror angles with respect to the target plane and angles which are closer than 30° to the normal are generally undesirable since they require an increased range of frequency scan. Also, for moving targets it is preferable that the target be illuminated only when the illumination angle is essentially normal to the receiver array in order to avoid scan in the array direction.

The required change in scan frequency may be approximated by the equation $$\Delta f = \frac{c}{2(\Delta x) \cos \theta_i}$$

where $\Delta x$ is the length of a resolution cell and $\theta_i$ is the incident angle measured between a line from the transmitter to the target and a normal to the linear receiving array. For example, for a 10.6 $\mu$m transmission center frequency and a resolution cell, $\Delta x$, equal to 0.3. meters and with an illumination incident angle of 45° required change in frequency is $$\Delta f = \frac{300 \times 10^6}{2 \times 0.3 \times 0.707} = 707 \text{ MHz}.$$

This "scanning bandwidth" is within the tuning capability of a pressure broadened $CO_2$ laser. For example, to achieve 50 resolution cells in the scan direction, 50 frequency steps with a 14 MHz increment between each step may be implemented.

As will be explained hereinafter relative to FIG. 2, the receiver units incorporate a polarization referenced imaging processing technique which effectively eliminates the carrier frequency by translating the received signals first to a common difference frequency and then to a video frequency. Thus, the fact that the received signals are at different frequencies during each transmission period presents no problem to the image reconstruction. It is also noted that the ground diffraction pattern is slightly expanded/contracted in the direction of the receiving array as a result of the transmission frequency changes; however, this is a predictable effect which is easily compensated for in the imagery construction computations.

The polarization referenced imaging technique is disclosed and claimed in the above referenced application by W. P. Brown, Jr. and will only be summarized herein as background for explaining the operation of the receiver units of the imaging system of the subject invention. The polarization referenced imaging technique is based upon the fact that stronger glints from a target are likely to be specular reflections from nearly flat surfaces and hence preserve the polarization state of the source with which they are illuminated. On the other hand, there will be many sources of reflection from the target that will depolarize the incident illumination, such as multiple reflections from metallic surfaces or diffused reflection from painted surfaces. By using polarization to separate the reference (glint) signal from the imaging data, a clean reference may be obtained with which to phase the array for imaging.

Figure 2:
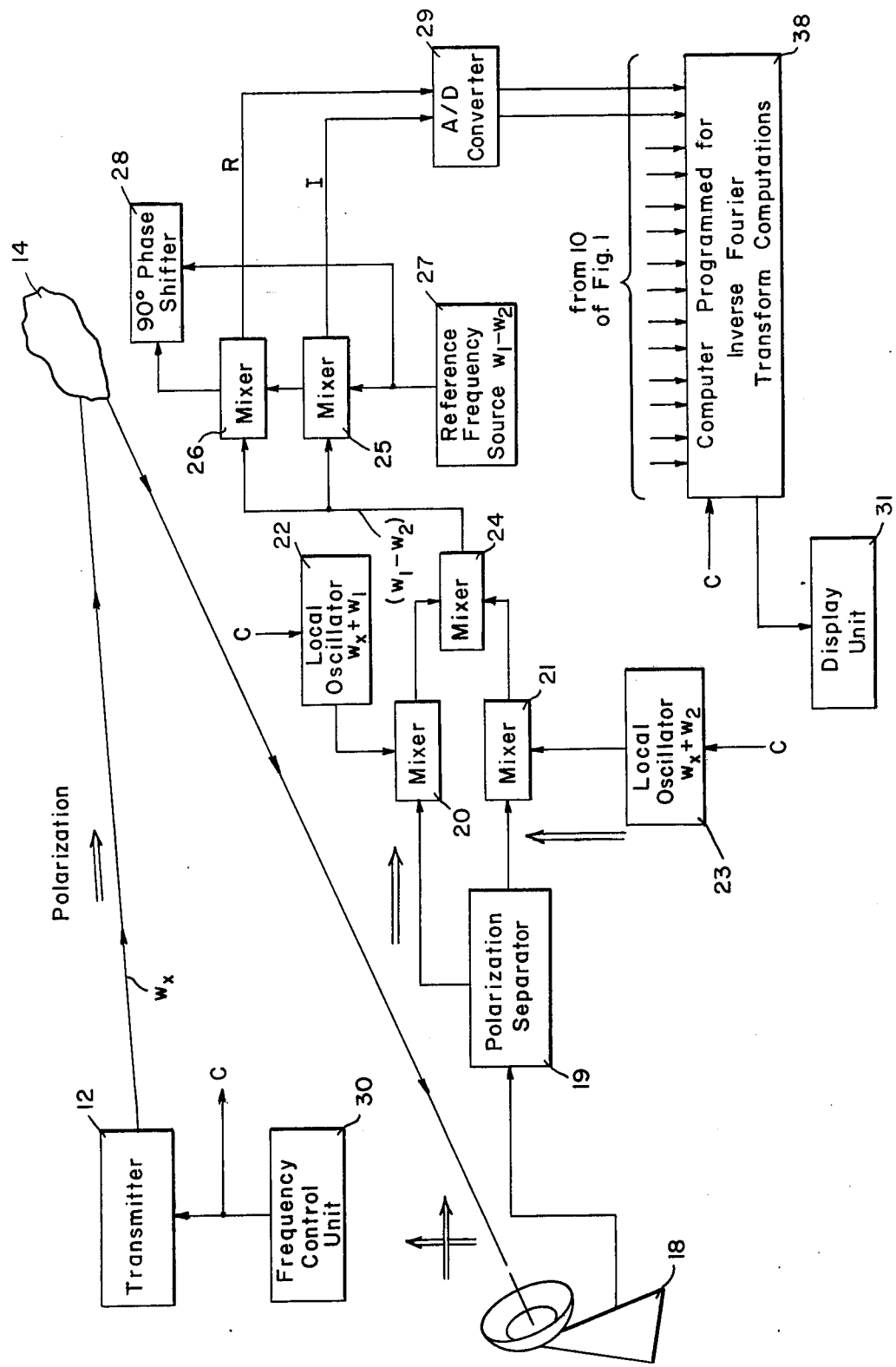
FIG. 2 is a block diagram of the transmitter and one of the receiver units of FIG. 1.

Referring now primarily to FIG. 2, transmitter 12 radiates a horizontally polarized beam of energy at a frequency $\omega$ towards target area 14 and a portion of this energy is returned to the linear array 10 (see FIG. 1). In FIG. 2 only one receiver unit is shown inasmuch as the receivers of array 10 may all be identical.

Some of the energy intercepted by receiving antenna 18 originated from a reference glint point on the target and is horizontally polarized and imagery data which has been diffused has substantial energy content in the orthogonal (vertical) polarization. The energy from antenna 18 is processed by polarization separator 19 such that the horizontally polarized energy is applied to a mixer 20 while the vertically polarized energy is applied to a second mixer 21. In mixer 20, the horizontally polarized referenced signal (glint) is multiplied by a horizontally polarized local oscillator signal applied from unit 22 which signal is shifted by a frequency $\omega_1$ from the transmitter frequency $\omega_x$. Similarly, the vertically polarized imagery signal is multiplied within mixer 21 with a vertically polarized local oscillator signal that is shifted by a frequency $\omega_2$ from the transmitter frequency $\omega_x$. The difference frequency component is applied from mixer 20 and 21 to a third mixer 24 wherein the signals are multiplied to provide an output signal at the difference thereof, i.e. at a frequency $\omega_1 - \omega_2$. Because of the polarization referenced processing the output signal from mixer 24 is free of the carrier frequency as well as having eliminated common phase factors between the referenced glint signal and the imagery data. Such common phase factors include atmospheric phase distortions, the receiver's local oscillator's phase; and position errors of receiving elements within the array. The output signal from mixer 24 is synchronously detected within mixers 25 and 26, with the reference signals for these mixers being supplied by units 27 and 28 respectivey. The output signal from mixer 26 is the "real" component of the one sample of imagery data while the output signal from mixer 25 is the "imaginery" component thereof; and the combination of these two signals define the magnitude and phase of the sample. The output signals from mixers 25 and 26 are processed by analog to digital converter 29 and are then applied to a computer 38.

In a similar manner, the other receivers of linear array 10 (FIG. 1) provide samples of the diffraction pattern to computer 38 wherein they are stored in a plurality of storage registers, or other suitable input devices, for subsequent, sequential transfer to the computer's memory for processing by the computer. Following the first sample by each of the receivers of array 10, frequency control unit 30 provides a control signal designated "C" to transmitter 12 and in response thereto the transmitters frequency $\omega_x$ is incremented to a new value, e.g. increased by 14 MHz. As indicated hereinabove, the new transmitter frequency causes the diffraction pattern 16 (FIG. 1) to shift by one image resolution line and linear array 10 then takes N samples (one per receiver) and applies them to computer 38. This just described sequence is repeated for M frequency steps so that N samples (one per receiver) of each one of M (one per frequency step) lines of diffraction pattern 16 are provided to computer 29.

Computer 38 performs an inverse Fourier Transform computation on the N × M samples of the diffraction pattern in accordance with computer programming techniques well known in the art, so as to provide imagery data which is displayed on a display unit 31. One suitable such program is published in the International Business Machine Corp. (IBM) Applications Program (Bulletin GH20-0205-1) for System/360 Scientific Package, Version III of Programmer's Manual for program number 360A-CM-03X, tailored for the FORTRAN language. Within this Program Package, which is the Fifth Edition published August 1970, the subroutine HARM is the appliable program.

The control signals "C" are applied to computer 38 for a timing reference, i.e. a sample time base. The signal "C" could be derived from a pulse repetition frequency generator that has a preselected timing interval between pulses, e. g. 0.1 milliseconds. The "C" signals themselves may be in a parallel binary format so as to identify the given frequency step, for example, if M is equal to 50 then the "C" signals would sequence from 1 through 50 and then repeat.

The control signal "C" is also used to maintain synchronism between the receiver and the transmitter. As shown in FIG. 2, local oscillators 22 and 23 are offset from the transmitter frequency $\omega_x$ by the values $\omega_1$ and $\omega_2$, respectively. Local oscillator 22 which is shown in block diagram form in FIG. 2 may be readily implemented by techniques well known in the art. For example, it could comprise a stable oscillator having the frequency $\omega_o + \omega_1$ and a mixer for summing that frequency with a signal $\omega_y$ from a tunable oscillator (not shown); where the tunable oscillator is controlled by the control signal "C" and the frequency $\omega_o$ is the lowest one of the transmitter frequencies. Hence, for the first sampling period the tunable oscillator would have no output and the output from local oscillator 22 would be $\omega_o + \omega_1$ during the period the transmitter's frequency $\omega_x$ is equal to $\omega_o$. During the second transmission period the tunable oscillator's frequency $\omega_y$ would be equal to one frequency step, such as 14 MHz, for example, and the output of local oscillator 22 would be $\omega_o + \omega_1 + 14$ MHz. During the second transmission period the transmission frequency $\omega_x$ is $\omega_o + 14$ MHz.

The local oscillator 23 could be implemented in a similar manner to that just described for oscillator 22.

Figure 3:
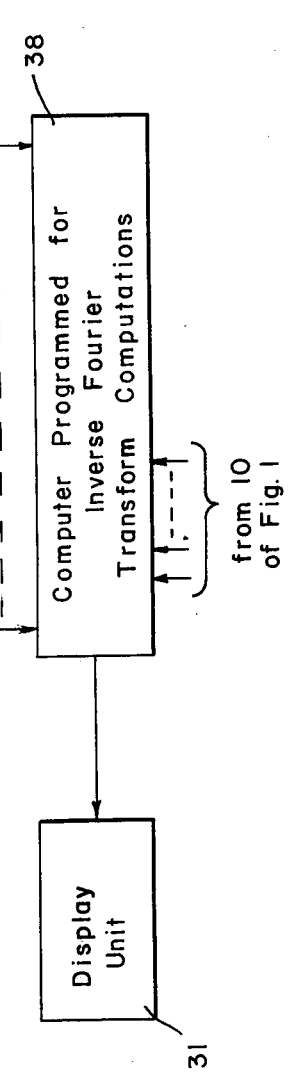
FIG. 3 is a block diagram of a second embodiment of the invention, whereby "scanning" is obtained by the simultaneous transmission of multiple frequency energy and the different image resolution lines are resolved by filtering within the receivers.

Referring now to the embodiment of the subject invention shown in FIG. 3, transmitter 12' transmits a beam of energy which simultaneously contains a plurality of frequencies separated by a preselected interval. For example, the transmitter 12' may transmit M frequencies $f_1$ and $f_2$ and ... $f_M$. The received energy reflected from target area 14 (see FIG. 1) is processed by each of the receiving units of array 10 (see FIG. 1) and since these units may be identical only one such unit is illustrated in FIG. 3. As there shown the energy received by antenna 18 is first applied to a filter assembly 32 wherein each of the M frequency components of the received signal is applied to an associated one of M parallel processing channels. For example, the lowest frequency band might be applied from filter assembly 32 to the polarization referenced processor 34 while the highest frequency channel might be processed through polarization referenced processor 36. It being understood that there are M - 2 parallel channels not shown and there are N - 1 other receivers in the linear array of FIG. 1 which are applying data to the computer 38 of FIG. 3.

In the operation of the embodiment of FIG. 3, each of the M frequencies of the transmitted signal causes a different resolution line of the target's image to be positioned in coincidence with the linear receiver array 10 so that the N receivers each simultaneousy produce M samples of the diffraction pattern. That is, the M parallel polarization referenced processing channels allow for the simultaneous processing of M samples by each receiver.

It is noted that the M polarization referenced processors utilized in the embodiment of FIG. 3, such as processors 34 and 36 for example, may be identical assemblies to that comprised of elements 19 through 29 of FIG. 2; except, of course, there is no need for the frequency tuning of oscillators 22 and 23 since in the embodiment of FIG. 3 each of the parallel processing channel will respond to a preselected input signal frequency.

Thus having described an improved linear array imaging system which not only allows a large reduction in the number of receiving units but which compensates for phase distortions encountered along the receiving path as well as position errors of the receiving elements within the array, what is claimed is:

1. A system for providing a set of N × M samples of a two-dimensional segment of the diffraction pattern from a target, said system comprising:
   transmitter means for transmitting energy at M discrete frequencies towards the target; and
   a linear array of N receivers disposed relative to said transmitter and said target such that for each of the M frequencies said receiver array intercepts a different line segment of the diffraction pattern from the target; and wherein each of said receivers includes means for processing the energy at the M frequencies so as to provide M samples of the diffraction pattern; and each of said receivers includes means for obtaining a reference signal from the energy of the received diffraction pattern, and means for frequency translating said received diffraction pattern energy by means of said reference signal so as to substantially remove effects of the carrier frequency from the samples.

2. A system according to claim 1 wherein said means for obtaining a reference signal includes polarization processing of the received energy such that received energy having the same polarization as the transmitted energy is utilized as the reference signal against which orthogonally polarized received energy is frequency translated.

3. A system for providing a set of N × M samples of a two-dimensional segment of the diffraction pattern from a target, said system comprising:
- a transmitter disposed for transmitting energy towards the target;
- means for controlling said transmitter such that the frequency of the transmitted energy is sequenced through M different values; and
- a linear array of N receivers disposed relative to said transmitter and to said target such that said receivers intercept a different line segment of the diffraction pattern from the target during the transmission period of each of said M different frequencies; said linear array thereby providing N × M samples of said diffraction pattern during the period said transmitter is sequenced through said M frequency steps; and wherein each of said receivers includes means for obtaining a reference signal from the energy of the received diffraction pattern and means for frequency translating said received diffraction pattern energy by means of said reference signal so as to substantially remove effects of the carrier frequency from the samples.

4. A system according to claim 3 wherein said means for obtaining a reference signal includes means for polarization processing the received energy such that received energy having the same polarization as the transmitted energy is utilized as the reference signal for frequency translating received energy having an orthogonal polarization.

* * * * *